(12) United States Patent
Chiang

(10) Patent No.: US 7,899,727 B2
(45) Date of Patent: Mar. 1, 2011

(54) SYSTEM AND METHOD FOR SECURITIES INFORMATION SERVICE

(75) Inventor: Yen Ting Chiang, Taipei (TW)

(73) Assignee: TelePaq Technology Inc. (TW)

( * ) Notice: Subject to any disclaimer, the term of this patent is extended or adjusted under 35 U.S.C. 154(b) by 582 days.

(21) Appl. No.: 11/890,717

(22) Filed: Aug. 7, 2007

(65) Prior Publication Data
US 2009/0043711 A1 Feb. 12, 2009

(51) Int. Cl.
G06Q 40/00 (2006.01)

(52) U.S. Cl. .................................... 705/36 R

(58) Field of Classification Search ............... 348/143; 423/450; 435/23; 506/30; 623/23.57; 700/36; 702/19; 705/30–45; 725/44
See application file for complete search history.

(56) References Cited

U.S. PATENT DOCUMENTS

| | | | | |
|---|---|---|---|---|
| 6,850,906 | B1* | 2/2005 | Chadha et al. | 705/36 R |
| 6,920,432 | B1* | 7/2005 | Carey | 705/36 R |
| 7,587,350 | B1* | 9/2009 | Stewart et al. | 705/36 R |
| 2002/0152149 | A1* | 10/2002 | Tanaka et al. | 705/35 |
| 2003/0028455 | A1* | 2/2003 | Yamaguchi et al. | 705/35 |
| 2003/0110113 | A1* | 6/2003 | Martin | 705/36 |
| 2004/0098297 | A1* | 5/2004 | Borthwick | 705/10 |
| 2005/0262004 | A1* | 11/2005 | Sakata et al. | 705/37 |
| 2006/0195383 | A1* | 8/2006 | Masuda | 705/37 |
| 2006/0200395 | A1* | 9/2006 | Masuyama et al. | 705/35 |
| 2007/0299785 | A1* | 12/2007 | Tullberg | 705/36 R |
| 2007/0299787 | A1* | 12/2007 | Shelor et al. | 705/36 R |
| 2008/0097891 | A1* | 4/2008 | Park | 705/37 |

OTHER PUBLICATIONS

Automated Strategies for Investment Management, Netfolio Inc, Jul. 27, 1999.*
System and Method for Creating and Managing New and Existing Financial Instruments, Merrill Lynch and Co Inc, Aug. 10, 2001.*

* cited by examiner

*Primary Examiner*—Mary Cheung
*Assistant Examiner*—Tien C Nguyen

(57) ABSTRACT

A securities information service system comprises: a service module and a query module. The service module is used to accept a register request from a user and provide a user record. The query module is used to establish a comparison condition according to the user record. The service module is also used to accept a securities message. When the securities message satisfies the comparison condition, the service module will recommend the securities to the user. The securities information service system recommends the securities to users according to the comparison results in order to raise the users' identification and satisfaction with the recommended securities.

8 Claims, 3 Drawing Sheets

SYSTEM AND METHOD FOR SECURITIES INFORMATION SERVICE

BACKGROUND OF INVENTION

1. Field of the Invention

The invention relates to a method and system for securities information service, and more particularly, to a method and system for recommending securities to users by establishing a comparison correlation between user record and securities message.

2. Description of the Prior Art

As the information technology advances, the demand for instant information and communication has grown exponentially, and the development of various portable wireless communication devices is constantly underway to satisfy the needs of consumers. For example, the development of a variety of cell phones, smart phones, devices for stock management, and PDA with mobile communication function etc.

In addition to the various wireless communication devices that have been developed, many software and functions have also been introduced to assist in the application of the above-mentioned hardware, so as to allow users to make financial arrangements, obtain information, or work in a more convenient and instantaneous fashion. One of the examples is the use of a wireless communication device to engage in the electronic transactions related to stocks, futures, or securities etc. In addition to electronic trading, real time recommendation for negotiable securities is also an important function, which cannot be omitted to help users judge the potential negotiable securities and know well about the best timing for trading.

At this moment, the conventional securities information service will not consider user's real need when it recommends negotiable securities to users. The recommended negotiable securities and its related news data will be transmitted into user's wireless communication device no matter whether it is in the category that user is interested in. User has to search and filter out the news he wants to know piece by piece from these news data by himself. Not only the negotiable securities recommendation about user's real need cannot be provided immediately, but also user's time is wasted. This will reduce the willingness of users to read the recommended messages, and imperceptibly reduce the users' satisfaction with the system.

SUMMARY OF INVENTION

The main objective of the invention is to provide a method and system for securities information service, which can recommend potential negotiable securities to users that users are interested in by establishing comparison correlations between user records and securities messages, such that the time for the users to query securities messages is shorted, the energy for the users to find out the potential securities from huge amount of negotiable securities is reduced.

In order to achieve the above objectives, the present invention discloses a securities information service system comprising a service module and a query module. The service module is used to accept a register request from a user and provide a user record. The user record is one of the following: User Favorite Stock Set, query records, trading records and personal data. The query module will establish a comparison condition according to the user record. The service module accepts a securities message. The securities message is one of the following: real time message and After-Hour message. When the securities message satisfies the comparison condition, the securities will be recommended to user. The securities information service system can recommend securities to users according to the results of the comparison between user records and securities messages, such that the users' identification and satisfaction with the recommended securities can be raised.

In a preferred embodiment, the securities information service system can further comprise a securities database, a securities real time server and a communication network system. The securities database is used to store a plurality of securities data. Each securities data can further comprise a securities basic data table, a commodities type serial number table and a securities classification table. The query module queries the corresponding securities data according to a securities name contained in the user record, and establishes a user favorite category classification. The user favorite category classification comprises at least the following columns: user code, classification serial number and ratio. The query module establishes the comparison condition according to the appearance ration of each classification serial number in the user favorite category classification. The securities real time server is used to accept raw data provided from data source. After the process in the securities real time server, the securities real time server produces securities data and securities messages from the raw data and provides the securities data to the securities database, and the securities messages to the service module. The service module can accept a login request from a user through a communication network system. When the securities message satisfies the comparison condition, the securities will be recommended to the user through the communication network system.

In order to achieve the above objectives, the present invention discloses a securities information service method comprising the following steps:

Accept a login request from a user and provide at least one user record for the user, wherein the user record is one of the following: User Favorite Stock Set, query records, trading records and personal data.

Establish a securities database, which is used to store a plurality of securities data. Each securities data comprises a securities basic data table, a commodities type serial number table and a securities classification table.

Query at least one corresponding securities data according at least one securities name contained in the user record. Establish a user favorite category classification according to the corresponding securities data.

The user favorite category classification comprises at least the following columns: user code, classification serial number and ratio. And establish a comparison condition according to the appearance ration of each classification serial number in the user favorite category classification.

Accept at least one securities message. The securities message is one of the following: real time message and After-Hour message.

When the securities message satisfies at least one comparison condition, the securities will be recommended to the user through a communication network system, wherein the communication network system also accepts the login requests from users.

DETAILED DESCRIPTION

The main principle that underlies the method and system for securities information service according to this invention is that; establish a comparison correlation between a user record and a securities message. A service module and a query module accomplish the comparison correlation. The service module is used to accept a register request from a user and provide a user record. The user record is one of the following: User Favorite Stock Set, query records, trading records and personal data. The query module establishes a comparison condition according to the user record. The service module also accepts a securities message. The securities message is one of the following: real time message and After-Hour message. When the securities message satisfies the comparison condition, the securities will be recommended to the user. The securities information system can recommend the securities to the users according to the results of the comparison between the user records and the securities messages, such that the users' identification and satisfaction with the recommended securities can be raised.

Figure 1:
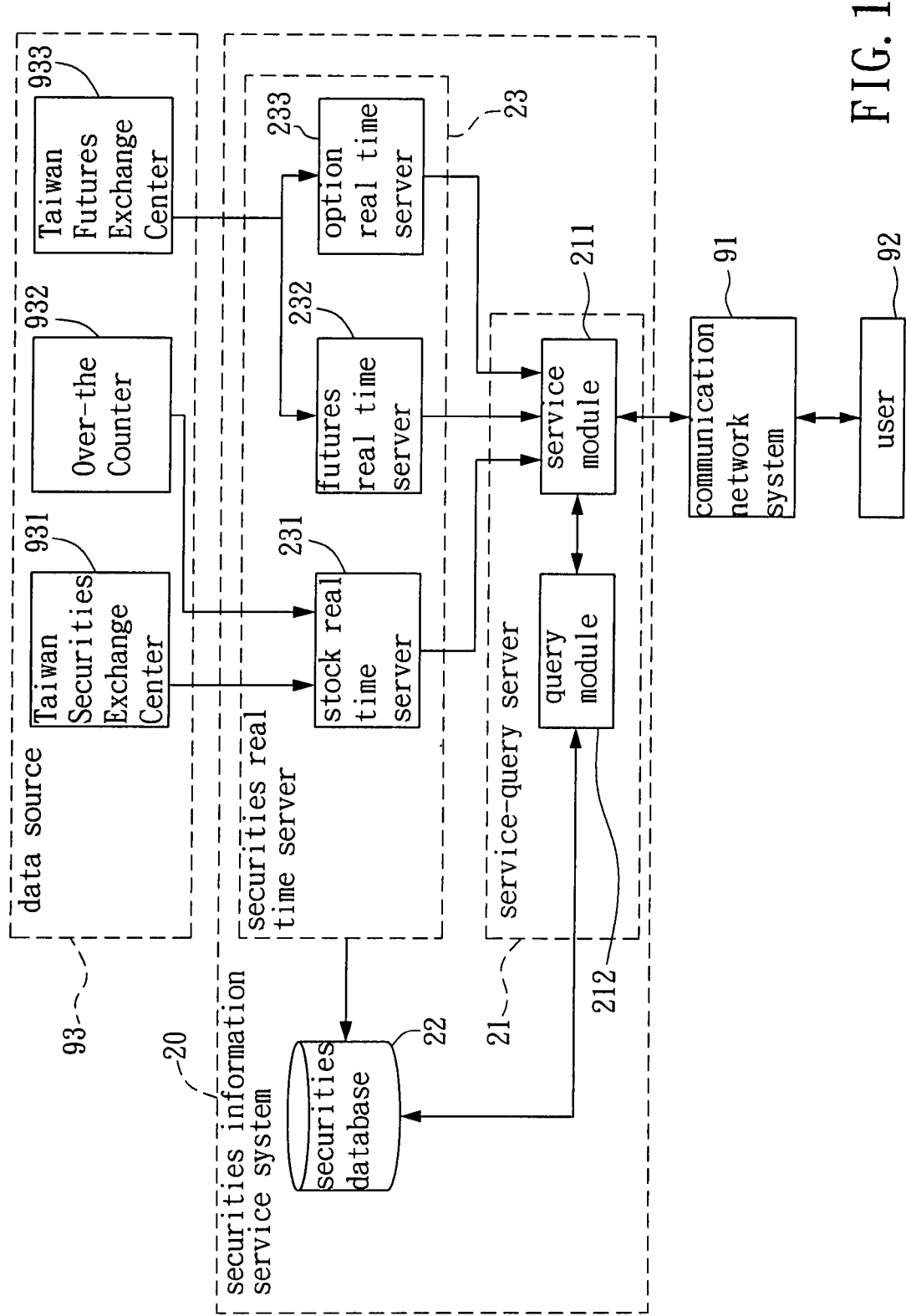
FIG. 1 is a schematic view showing a securities information service system according to a preferred embodiment of the invention.
Figure 2:
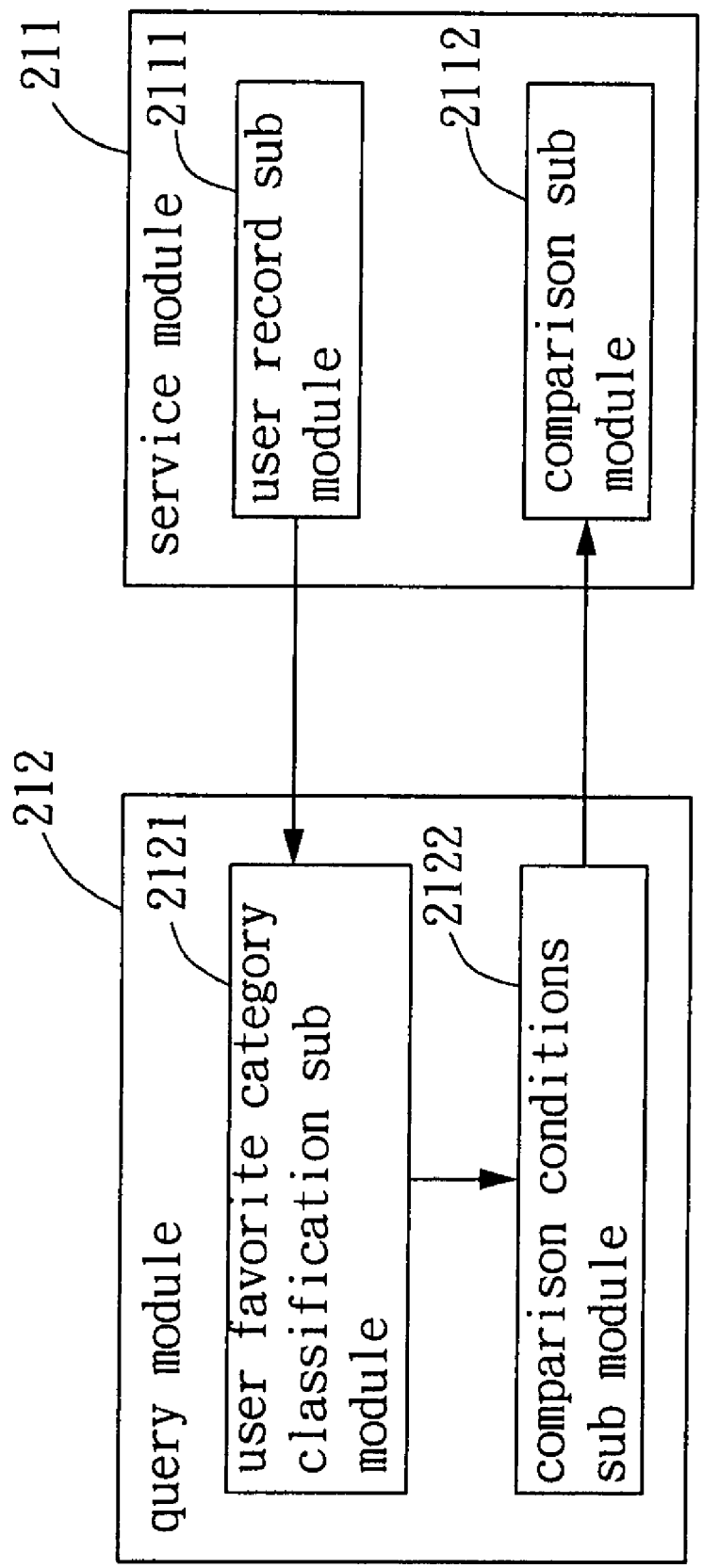
FIG. 2 is a schematic view showing a service server and a query server inside a securities information service system according to a preferred embodiment of the invention.

Please refer to FIG. 1 and FIG. 2, wherein FIG. 1 is a schematic view showing a securities information service system according to a preferred embodiment of the invention, FIG. 2 is a schematic view showing a service server and a query server inside a securities information service system according to a preferred embodiment of the invention. Basically the securities information service system of the invention 20 is established in an electronic transaction environment comprising a communication network system 91 (for example, wireless communication systems like GSM, CDMA, GPRS, PHS, and WLAN, but is not limited to such scope). Such environment lets a user 92 from outside to establish a connection, and accepts raw data from data source 93 (finance securities service organization, for example, Taiwan Securities Exchange Center 931, Over-the Counter 932, Taiwan Futures Exchange Center 933 etc.). The raw data can contain the basic data or trading messages of each of the securities. In this preferred embodiment, the user 92 can be a smart phone, which can execute the wireless data transmission, a handheld stock exchange terminal, or a portable PDA with mobile communication function etc. Such devices connect to the securities information service system of the invention 20 via a mobile communication network like GPRS (General Packet Radio Service). Subsequently this in turn enables the securities information service system of the invention 20 and user 92 to connect to each other wirelessly and transmit data.

In this preferred embodiment, the securities information service system of the invention 20 comprises a service-query server 21, a securities database 22 and a securities real time server, wherein the service-query server 21 can further comprise a service module 211 and a query module 212; the securities real time server 23 can further comprise a stock real time server 231, a futures real time server 232 and a option real time server 233. Wherein the service module 211 can further comprise a user record sub module 2111 and a comparison sub module 2112; the query module 212 can further comprise a user favorite category classification sub module 2121 and a comparison conditions sub module 2122. The securities real time server 23 can accept the stock names (for example "TSMC") of all the stocks or futures, the stock messages (for example, "huge amount transaction") and the stock data (for example, "electronic", "mechanical and electronic", "listed securities", "OTC securities" etc stock classification data) corresponding to each stock name from an outside data source 93. Afterwards store the stock data (comprising Table 1: stock basic data table, Table 2: commodities type serial number table and Table 3: stock classification table) into the securities database 22.

TABLE 1 stock basic data table

| Field | Description |
| --- | --- |
| security_num | Commodities Serial Number |
| market_id | Market Serial Number |
| symbol | Commodities Code |
| type_id | Commodities Type, please refer Commodities Type Serial Number |
| secotr_id | Category Serial Number (1: Cement, 2: Food, 3: Electronic, etc.) |
| fullname | Commodities Name |
| start_date | Listed Date |
| end_date | Off List Date |
| hot_stock_flag | whether the Hot Stock in the default Stock Name table |

As what is shown in Table 1, the stock basic data table comprises the following columns: Commodities Serial Number, Market Serial Number, Commodities Code, Commodities Type, Category Serial Number, Commodities Name, Listed Date, Off List Date and whether the Hot Stock in the default Stock Name table.

TABLE 2 commodities type serial number table

| Type_ID | | |
| --- | --- | --- |
| 1 | TYPE_STOCK | Stock |
| 2 | TYPE_WARRANT | Warrant |
| 3 | TYPE_INDEX | Index |
| 4 | TYPE_FUTURE | Future |
| 5 | TYPE_OPTION | Option |
| 6 | TYPE_NEW_INDEX | New Taiwan Index (TW50, TWMC, TWIT) |
| 7 | TYPE_ETF | Index Stock Type Fund |

As what is shown in Table 2, the commodities type serial number table comprises the following columns: Stock, Warrant, Index, Future, Option, New Taiwan Index and Index Stock Type Fund.

TABLE 3 stock classification table

| Field | Description |
| --- | --- |
| class_sn | Classification Serial Number |
| market_id | Market Serial Number |
| type_id | Commodities Type (Stock, Index etc.) |
| sector_id | Classification Number (Electronic, Cementetc.) |
| name | Classification Name |

As what is shown in Table 3, the stock classification table comprises the following columns: Classification Serial Number, Market Serial Number, Commodities Type, Classification Number and Classification Name. When a user 92 wants to login in the securities information service system 20 (for example, "power on login" or "manual login"), the service module 211 will accept a register request from the user 92, query a user record from user record sub module 2111 according to the user ID using in the register request and provide the user record to query module 212. Wherein the user record is one of the following: User Favorite Stock Set, query records, trading records and personal data. If the user 92 has no User Favorite Stock Set, query records and trading records in user record sub module 2111 (for example, the first time login), the service module 211 should provide a personal data of the user 92 to the query module 212. Wherein the personal data comprises the personal favorite securities names of the user 92. If originally the user 92 didn't provide the personal favorite securities names in his personal data, a particular name (for example, "no favorite securities") will be attached to the personal data of the user 92. When the query module 212 receives the user record, the user favorite category classification sub module 2121 will query a corresponding securities data from the securities database 22 according to the securities name contained in the user record, and establish a user favorite category classification according to the corresponding securities data.

TABLE 4 user favorite category classification

| Field | Description |
|---|---|
| user_id | User Code |
| class_sn | Classification Serial Number |
| ratio | Ratio (No. of stock in the Classification/No. of all stocks in Portfolio) |

As what is shown in Table 4, the user favorite category classification table comprises at lest the following columns: User Code, Classification Serial Number and Ratio. The user favorite category classification is the analysis result from the corresponding securities data. Take the user portfolio for example, if certain user A has stocks in his portfolio as: TSMC(2330), UMC(2303), ASUS(2357), FOXCONN (2317), ASE(2311), TCCC(1101) and PRESIDENT(11216), we can have the basic data of portfolio as Table 5 by using Table 1, Table 2 and Table 3:

TABLE 5 basic data of user A's portfolio

| Commodities Name | Commodities Type | Category Serial Number | Classification Serial Number |
|---|---|---|---|
| TSMC | Stock | 3: Electronic | 3 |
| UMC | Stock | 3: Electronic | 3 |
| ASUS | Stock | 3: Electronic | 3 |
| FOXCONN | Stock | 3: Electronic | 3 |
| ASE | Stock | 3: Electronic | 3 |
| TCCC | Stock | 1: Cement | 1 |
| PRESIDENT | Stock | 2: Food | 2 |

We can establish user A's user favorite category classification by utilizing these basic data of portfolio.

TABLE 6 user A's user favorite category classification

| User Code | Classification Serial Number | Ratio |
|---|---|---|
| A | 1 | 1/7 |
| A | 2 | 1/7 |
| A | 3 | 5/7 |

As what is shown in Table 6, the user A's user favorite category classification indicates that classification serial number 3 has the highest weight in the ratio, therefore electronic stock category is the stock category that user A is interested in. Besides the portfolio, query records, trading records and personal data can be the references for the user favorite category classification and each reference can have different weight.

Once the user favorite category classification sub module 2121 establishes the user favorite category classification, the comparison condition sub module 2122 will establish at least one comparison condition according to the user favorite category classification, and provide the comparison condition to comparison sub module 2112. The comparison condition is established according to the appearance ratio of each classification serial number of the user favorite category classification. Take the user A for example, electronic stock category (classification serial number 3) has the highest weight, therefore the comparison condition can be set as: if there is any change for the stocks in "electronic stock category", the real time or After-Hour information, for example: huge amount transaction, largest Up Margin and the other real time news etc., or Buy In from the fund or Buy In from the owner and the other After-Hour news etc., can be regarded as the satisfied conditions for the system to recommend securities.

The securities real time server 23 is used to receive the raw data from data source 93. After the process for the raw securities data in the securities real time server 23, the securities real time server 23 produces securities data and securities messages from the raw data and provides the securities data to the securities database 22 for further storage purpose, and provides the securities messages to the service module 211. Wherein the securities source 93 can be any finance securities service organization, for example, Taiwan Securities Exchange Center 931, Over-the Counter 932, Taiwan Futures Exchange Center 933 etc. Wherein the stock real time server 231 receives the raw data from the Taiwan Securities Exchange Center 931 and the Over-the Counter 932, futures real time server 232 and option real time server 233 receives the raw data from the Taiwan Futures Exchange Center 933.

The service module 211 can accept securities messages transmitted from securities real time server 23, wherein the securities messages comprise one of the following: real time messages and After-Hour messages. The real time messages comprise at least one of the following: huge amount transaction, largest Up Margin and real time news. The After-Hour messages comprise at least one of the following: Buy In from the fund, Buy In from the owner and After-Hour news. The service module 211 can recommend the securities to the user 92 according to the comparison result between the securities message and the comparison condition, wherein the recommended securities can comprise at least one of the following: securities name, securities code and securities message. The securities information service system 20 can recommend the securities to user 92 through the communication network system 91, also the user 92 can submit a register request to the securities information service system 20 through the communication network system 91.

Figure 3:
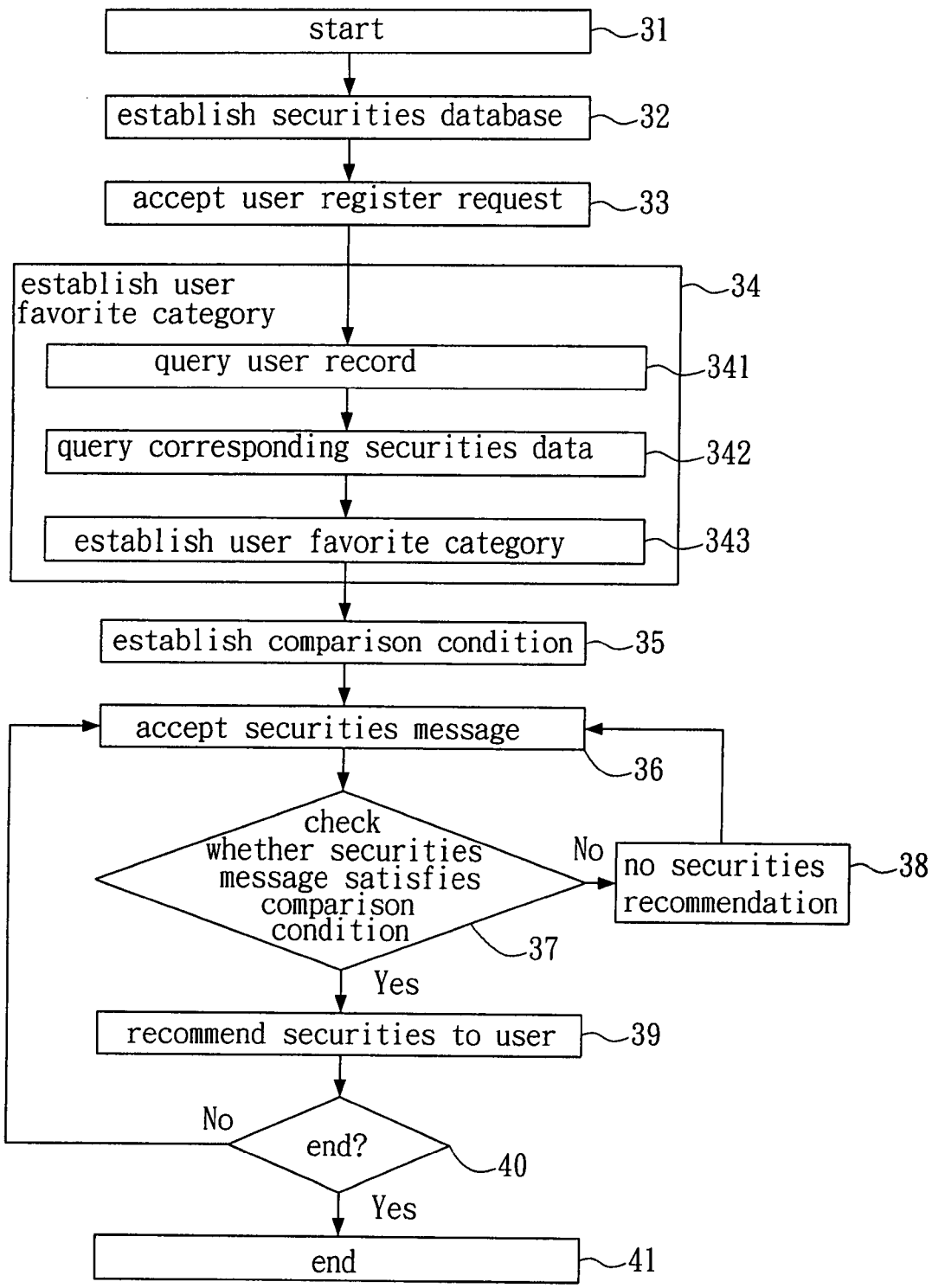
FIG. 3 is a flow chart showing the process in the method for securities information service according to a preferred embodiment of the invention.

Please refer to FIG. 3, wherein FIG. 3 is a flow chart showing the process in the method for securities information service according to a preferred embodiment of the invention, comprising the following steps:

Step 31: User can manually decide whether to start the securities information service system, wherein user also can choose to login the securities information service system immediately during the power on process (i.e. execute the step 33 directly).

Step 32: Establish a securities database, which is used to store a plurality of securities data. Each securities data can further comprise a securities basic data table, a commodities type serial number table and a securities classification table.

Step 33: Accept a register request from a user, wherein the register request from the user can be through a communication network system.

Step 34: Analyze the data and establish a user favorite category classification, wherein the Step 34 can be divided into three sub steps including: Step 341: Query a corresponding user record according to a user ID using in the register request from the user; Step 342: Query a corresponding securities data from the securities database according to a securities name contained in the user record; and Step 343: Establish a user favorite category classification according to the corresponding securities data. Wherein in Step 34, the user record is one of the following: User Favorite Stock Set, query records, trading records and personal data; the user favorite category classification comprises at least the following columns: user code, classification serial number and ratio.

Step 35: Establish a comparison condition according to the appearance ration of each classification serial number in the user favorite category classification.

Step 36: Accept a securities message, wherein the securities message comprises one of the following: real time message and After-Hour message, wherein the real time message comprises at least one of the following: huge amount transaction, largest Up Margin and real time news; the After-Hour message comprises at least one of the following: Buy In from the fund, Buy In from the owner and After-Hour news.

Step 37: Check whether the securities message satisfies the comparison condition, if "Yes", then execute Step 38; if "No", then execute Step 39.

Step 38: There is no recommendation for the securities and execute Step 36.

Step 39: Recommend the securities to the user, wherein the recommendation can be through a communication network system.

Step 40: User can manually decide whether to end the securities information service, wherein if "No", then execute Step 36; if "Yes", then execute Step 41.

Step 41: End of the securities information service.

The preferred embodiments of the invention have been disclosed above, which however should not be construed as a limitation on the actual application of the invention. Hence all modifications and alterations made by those familiar with the skill without departing from the spirits of the invention and appended claims shall remain within the protected scope of the invention.

What is claimed is:

1. A system for securities information service, comprising:
   a service module stored in a memory, for accepting a register request from a user and providing at least one user record to the user according to the register request, and accepting at least one securities message; wherein the user record comprises one of the following: User Favorite Stock Set, query record, trading record and personal data;
   a securities database, for storing a plurality of securities data, and each securities data further comprising a securities basic data table, a commodities type serial number table and a securities classification table; and
   a query module, for establishing at least one comparison condition according to the user record; said query module querying at least one corresponding securities data from the securities database according to at least one securities name contained in the user record, and establishing a user favorite category classification according to the corresponding securities data, and establishing said at least one comparison condition according to the user favorite category classification; wherein the user favorite category classification comprises at least the following columns: user code, classification serial number and ratio; wherein the ratio refers to an appearance ratio of each of the classification serial number contained in the user favorite category classification; wherein the comparison condition is established according to said appearance ratio in such a manner that, the classification serial number having the highest appearance ratio has the highest weight in the user favorite category classification;
   wherein when the securities message satisfies at least one of the comparison condition, the service module will recommend the securities to the user; wherein, any securities message matches the classification serial number with the highest weight is regarded as the satisfied securities message and is recommended to the user.

2. The system of claim 1, wherein the securities message comprises one of the following: real time message and After-Hour message.

3. The system of claim 1, wherein the recommended securities comprises at least one of the following: securities name, securities code and securities message.

4. The system of claim 1, further comprising:
   a securities real time server, for accepting a raw data from a data source, and after the process to the raw data, the securities real time server producing at least one of the following: a securities data and a securities message, and providing the securities data to the securities database, and providing the securities message to the service module.

5. The system of claim 4, wherein the securities real time server comprises at least one of the following: stock real time server, futures real time server and option real time server.

6. A method for securities information service, being accomplished by a securities information service system which comprises a securities real time server, a service-query server and a securities database, said service-query server comprising a service module and a query module, said method comprising:
   Step (1): using the service module to accept accepting a register request from a user and providing at least one user record to the user; wherein the user record comprises at least one of the following: User Favorite Stock Set, query record, trading record and personal data;
   Step (2): using the securities database to store a plurality of securities data, and each securities data comprising a securities basic data table, a commodities type serial number table and a securities classification table;
   Step (3): using the query module to establish establishing at least one comparison condition according to the user record; said query module querying at least one corresponding securities data from the securities database according to at least one securities name contained in the user record, and establishing a user favorite category classification according to the corresponding securities data, and establishing said at least one comparison condition according to the user favorite category classification; wherein the user favorite category classification comprises at least the following columns: user code, classification serial number and ratio; wherein the ratio refers to an appearance ratio of each of the classification serial number contained in the user favorite category classification; wherein the comparison condition is established according to said appearance ratio in such a manner that, the classification serial number having the highest appearance ratio has the highest weight in the user favorite category classification;

Step (4): using the service module to accept accepting at least one securities message from the securities real time server, when the securities message satisfies at least one of the comparison condition, recommending the securities to the user; wherein, any securities message matches the classification serial number with the highest weight is regarded as the satisfied securities message and is recommended to the user.

7. The method of claim 6, wherein the securities message comprises one of the following: real time message and After-Hour message.

8. The method of claim 6, wherein in the Step (4) of recommending securities further comprises:

accepting at least one securities message, and checking whether the securities message satisfies the comparison condition; if "No", then there is no recommendation about the securities to the user, and re-accepting at least one securities message;

if "Yes", then recommending the securities to the user, and when the user receives the recommended securities, the user can manually decide whether to terminate using the securities information service, wherein if "No", then re-accepting at least one securities message; if "Yes", then terminating using the securities information service.

\* \* \* \* \*